(12) United States Patent
Craig et al.

(10) Patent No.: US 11,275,578 B2
(45) Date of Patent: *Mar. 15, 2022

(54) MERIT BASED INCLUSION OF CHANGES IN A BUILD OF A SOFTWARE SYSTEM

(71) Applicant: International Business Machines Corporation, Armonk, NY (US)

(72) Inventors: Erik B. Craig, Raleigh, NC (US); Paul F. McMahan, Apex, NC (US); Spenser E. Shumaker, Raleigh, NC (US); Daniel B. Varga, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,284

(22) Filed: Apr. 24, 2020

(65) Prior Publication Data

US 2020/0257525 A1 Aug. 13, 2020

Related U.S. Application Data

(63) Continuation of application No. 16/282,225, filed on Feb. 21, 2019, now Pat. No. 10,698,683, which is a
(Continued)

(51) Int. Cl.
*G06F 9/44* (2018.01)
*G06F 8/70* (2018.01)
(Continued)

(52) U.S. Cl.
CPC .............. *G06F 8/71* (2013.01); *G06F 8/41* (2013.01); *G06Q 10/0631* (2013.01); *G06F 8/70* (2013.01); *G06F 8/77* (2013.01)

(58) Field of Classification Search
CPC ...... G06F 8/41; G06F 8/70; G06F 8/71; G06F 8/77; G06Q 10/0631
See application file for complete search history.

(56) References Cited

U.S. PATENT DOCUMENTS 7,596,778 B2  9/2009  Kolawa et al.
8,037,453 B1  10/2011  Zawadzki
(Continued)

OTHER PUBLICATIONS

Panagiotou, D. et al., "Active support and reaL-time coordination based on Event pRocessing in open source software development (ALERT)," 7th Framework Program, Project No. 258098, Sep. 30, 2011 [retrieved <http://portal2-alert.atosorigin.es/sites/portal2-alert.atosorigin.es/files/content-files/download/1st%20iteration%20prototype%20of%20the%20profiler.pdf>, 49 pg.
(Continued)

*Primary Examiner* — Hanh Thi-Minh Bui
(74) *Attorney, Agent, or Firm* — Cuenot, Forsythe & Kim, LLC

(57) ABSTRACT

Software configuration management for a software system under development includes receiving a change to the software system under development from a first user, determining a merit score for the first user, wherein the merit score is calculated according to success of prior changes received from the first user, and comparing, using a processor, the merit score for the first user with a merit threshold for the software system under development. The change is accepted for inclusion in a build of the software system under development responsive to determining that the merit score for the first user complies with the merit threshold.

15 Claims, 3 Drawing Sheets

Related U.S. Application Data continuation of application No. 15/630,733, filed on Jun. 22, 2017, now Pat. No. 10,248,413, which is a continuation of application No. 14/050,716, filed on Oct. 10, 2013, now Pat. No. 9,720,684, which is a continuation of application No. 14/028,794, filed on Sep. 17, 2013, now Pat. No. 9,720,683.

(51) Int. Cl.

| | | |
|---|---|---|
| *G06F 8/71* | (2018.01) | |
| *G06Q 10/06* | (2012.01) | |
| *G06F 8/41* | (2018.01) | |
| *G06F 8/77* | (2018.01) | |

(56) References Cited

U.S. PATENT DOCUMENTS

| | | | | |
|---|---|---|---|---|
| 8,356,278 | B2 | 1/2013 | Drissi et al. | |
| 8,418,147 | B1 | 4/2013 | Odenwelder et al. | |
| 8,584,079 | B2 | 11/2013 | Yassin et al. | |
| 8,656,343 | B2 * | 2/2014 | Fox | G06F 8/70 |
| | | | | 717/101 |
| 8,856,725 | B1 | 10/2014 | Anderson et al. | |
| 9,223,849 | B1 | 12/2015 | Bilinski et al. | |
| 9,383,976 | B1 * | 7/2016 | Singh | G06F 8/70 |
| 9,720,683 | B2 | 8/2017 | Craig et al. | |
| 9,720,684 | B2 | 8/2017 | Craig et al. | |
| 10,248,413 | B2 | 4/2019 | Craig et al. | |
| 2005/0015675 | A1 | 1/2005 | Kolawa et al. | |
| 2007/0168946 | A1 | 7/2007 | Drissi et al. | |
| 2007/0220479 | A1 | 9/2007 | Hughes | |
| 2009/0300720 | A1 | 12/2009 | Guo et al. | |
| 2009/0307604 | A1 | 12/2009 | Giles et al. | |
| 2010/0030626 | A1 | 2/2010 | Hughes et al. | |
| 2010/0050156 | A1 | 2/2010 | Bonanno et al. | |
| 2011/0199902 | A1 | 8/2011 | Leavy | |
| 2011/0252394 | A1 | 10/2011 | Sharma et al. | |
| 2012/0079456 | A1 | 3/2012 | Kannan et al. | |
| 2012/0174071 | A1 | 7/2012 | Kannan et al. | |
| 2012/0311534 | A1 | 12/2012 | Fox et al. | |
| 2013/0268348 | A1 | 10/2013 | Zhou et al. | |
| 2014/0075414 | A1 | 3/2014 | Fox et al. | |
| 2014/0313891 | A1 | 10/2014 | Leavy et al. | |
| 2015/0082267 | A1 | 3/2015 | Craig et al. | |
| 2015/0082268 | A1 | 3/2015 | Craig et al. | |
| 2015/0220336 | A1 | 8/2015 | Kannan et al. | |
| 2016/0034270 | A1 | 2/2016 | Swierc et al. | |
| 2017/0091078 | A1 | 3/2017 | Atyam | |
| 2017/0286101 | A1 | 10/2017 | Craig et al. | |
| 2019/0026106 | A1 | 1/2019 | Burton | |
| 2019/0179632 | A1 | 6/2019 | Craig et al. | |

OTHER PUBLICATIONS

Ali, M.Q. et al., "Automated anomaly detector adaptation using adaptive threshold tuning," ACM Transactions on Information and System Security (TISSEC) vol. 15, No. 4, 2013, 17 pg.

Stephan, M. et al., "A Survey of Model Comparison Approaches and Applications," In Modelsward, Feb. 19, 2013, pp. 265-277.

U.S. Appl. No. 14/028,794, Non-Final Office Action, dated Mar. 27, 2015, 19 pg.

U.S. Appl. No. 14/028,794, Final Office Action, dated Sep. 30, 2015, 25 pg.

U.S. Appl. No. 14/028,794, Notice of Allowance, dated Mar. 27, 2017, 10 pg.

U.S. Appl. No. 14/050,716, Non-Final Office Action, dated Mar. 25, 2015, 16 pg.

U.S. Appl. No. 14/050,716, Final Office Action, dated Sep. 30, 2015, 20 pg.

U.S. Appl. No. 14/050,716, Notice of Allowance, dated Mar. 24, 2017, 11 pg.

U.S. Appl. No. 15/630,733, Non-Final Office Action, dated Apr. 27, 2018, 17 pg.

U.S. Appl. No. 15/630,733, Final Office Action, dated Oct. 25, 2018, 19 pg.

U.S. Appl. No. 15/630,733, Notice of Allowance, dated Nov. 15, 2018, 10 pg.

U.S. Appl. No. 16/282,225, Non-Final Office Action, dated Nov. 29, 2019, 16 pg.

U.S. Appl. No. 16/282,225, Notice of Allowance, dated Feb. 25, 2020, 14 pg.

Henriksen, A. et al., "A Practical R&D Project-Selection Scoring Tool," In IEEE Transactions on Engineering Management, May 1999, vol. 46, No. 2, pp. 158-170.

\* cited by examiner

MERIT BASED INCLUSION OF CHANGES IN A BUILD OF A SOFTWARE SYSTEM

BACKGROUND

One challenge faced by many software development organizations is the need to continually create usable builds of a software system under development (SSUD). A software development organization must ensure that there is always a build that is usable and that includes the most recent program code updates so that downstream parties may utilize the build for a variety of reasons. Examples of downstream parties include, but are not limited to, test teams within the development organization itself, early adopters such as customers and end-users, integrating partners such as third party development organizations that create products that interact with the SSUD, and the like.

A "build process" is the process of converting software artifacts such as source code files into standalone software artifact(s) that can be run or executed on a computer. A "build" is the result of the build process, e.g., the resulting executable software system. The build process typically includes compilation where source code files are converted into executable program code. In the case of a less complex SSUD, the build process may consist of a single file being compiled. For a more complex SSUD, however, the build process may involve many files that may be combined in different ways to produce many different versions of the SSUD.

Typically, the software development organization attends to the challenge of providing usable builds by creating a series of different builds of the SSUD. The builds are rated on a stability continuum where one end of the continuum is considered least stable and the opposite end of the continuum is considered most stable. The more stable the build, the more stringent the controls that determine what program code may be contributed to the build for purposes of further development and/or bug fixes.

BRIEF SUMMARY

This disclosure relates to software configuration management (SCM). More particularly, this disclosure relates to determining which changes are to be accepted and included in a build of a particular software system under development based upon merit.

A method includes receiving a change to a software system under development from a first user and determining a merit score for the first user. The merit score is calculated according to success of prior changes received from the first user. The method further includes comparing, using a processor, the merit score for the first user with a merit threshold for the software system under development and accepting the change for inclusion in a build of the software system under development responsive to determining that the merit score for the first user complies with the merit threshold.

A system includes a processor programmed to initiate executable operations. The executable operations include receiving a change to a software system under development from a first user and determining a merit score for the first user. The merit score is calculated according to success of prior changes received from the first user. The executable operations also include comparing the merit score for the first user with a merit threshold for the software system under development and accepting the change for inclusion in a build of the software system under development responsive to determining that the merit score for the first user complies with the merit threshold.

A computer program product includes a computer readable storage medium having program code stored thereon. The program code is executable by a processor to perform a method. The method includes receiving, using the processor, a change to a software system under development from a first user and determining, using the processor, a merit score for the first user. The merit score is calculated according to success of prior changes received from the first user. The method further includes comparing, using the processor, the merit score for the first user with a merit threshold for the software system under development and accepting, using the processor, the change for inclusion in a build of the software system under development responsive to determining that the merit score for the first user complies with the merit threshold.

DETAILED DESCRIPTION

Figure 1:
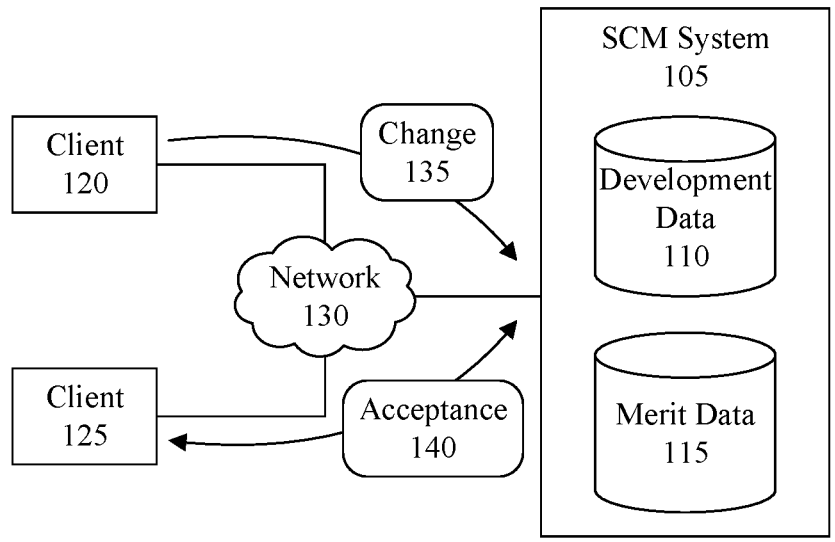
FIG. 1 is a block diagram illustrating an example of a network computing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This disclosure relates to software configuration management (SCM). More particularly, this disclosure relates to determining which changes are to be accepted and included in a build of a particular software system under development based upon merit. In accordance with the inventive arrangements disclosed herein, users are associated with merit scores. Contributions from a user that result in a positive outcome may increase the merit score for the user. Conversely, contributions from the user that result in a negative outcome may result in a decrease in the merit score for the user.

In illustration, when a user provides a change to an SCM system for a software system under development (SSUD), the merit score for the user is determined. The merit score can be compared with a merit threshold for purposes of determining whether the change is to be accepted and, as such, included, in a particular build of the SSUD. As noted and to be described herein in greater detail, the merit score for the user can be increased and/or decreased over time to reflect merit of the user based upon a history of the user's contributions. Further, the merit threshold to which the merit score for a user is compared may vary according to any of a variety of different criteria, thereby providing flexibility in determining which changes are to be accepted and which are not.

FIG. 1 is a block diagram illustrating an example of a network computing system 100. As pictured, network computing system 100 includes an SCM system 105, a client 120, and a client 125. Each of SCM system 105, client 120, and client 125 may be implemented as a data processing system. In one aspect, clients 120 and 125 may interact with SCM system 105 using a client/server communication model.

SCM system 105, client 120, and client 125 are interconnected, e.g., communicatively linked, through a network 130. Network 130 is the medium used to provide communications links between various devices and data processing systems connected together within network computing system 100. Network 130 may include connections, such as wire, wireless communication links, or fiber optic cables. Network 130 can be implemented as, or include, any of a variety of different communication technologies such as a WAN, a LAN, a wireless network, a mobile network, a Virtual Private Network (VPN), the Internet, the Public Switched Telephone Network (PSTN), or the like.

As pictured, SCM system 105 includes one or more storage devices that store development data 110 and merit data 115. Development data 110 includes software artifacts for an SSUD, control and/or tracking data for the software artifacts, and the like. A software artifact may be a source code file and/or other type of file that is used in the creation of a build of the SSUD. As noted, a "build" is the result of a build process, e.g., the resulting executable software system. Merit data 115 includes merit scores of users permitted to access SCM system 105 and merit thresholds for the SSUD. Merit data 115 further may include one or more rules that dictate the circumstances under which merit scores are adjusted, the direction of the adjustment, e.g., up or down, and the amount of the adjustment.

It should be appreciated that while development data 110 and merit data 115 are shown as being included within different storage devices within SCM system 105, in another example, development data 110 and merit data 115 may be stored within a same data storage device. In still another example, development data 110 and merit data 115 may be stored in one or more different and separate nodes and/or data processing systems inter-connected with SCM system 105. SCM system 105, as pictured in FIG. 1, is provided for purposes of illustration and not limitation.

In operation, a user, e.g., a first user, working through client 120 may submit a change 135 to SCM system 105. As used herein, the term "change" is one or more software artifacts for an SSUD managed by the SCM system that are delivered to the SCM from a user. The one or more software artifacts of the change have been modified from their original form or state or, alternatively, may be newly created for inclusion in a build of the SSUD.

Accordingly, change 135 is provided from the user of client 120 for inclusion in a particular build of an SSUD that is managed by SCM system 105. In one example, SCM system 105 receives change 135 and, responsive thereto, determines a merit score for the user of client 120. In general, the merit score for the user of client 120 is calculated according to prior changes received from the user and whether the prior changes resulted in a positive or a negative outcome.

SCM system 105 compares the merit score for the user of client 120 with a merit threshold established for the SSUD to which the change is to be applied. Responsive to determining that the merit score for the user of client 120 complies with the merit threshold, change 135 is accepted by SCM system 105. For example, change 135 may be included or used in a build of the SSUD.

In another example, the merit score for the user of client 120 may not comply with the merit threshold established for the SSUD. In that case, change 135 may be reviewed by a second user, e.g., the user of client 125. The user of client 125, for example, may have a merit score that is sufficiently high so that a review and acceptance from the user of client 125 lends credibility to change 135. Within this disclosure, an "acceptance" of a change by a user other than the user that is delivering the change to the SCM system means that such other user has reviewed the change and subsequently accepted, or approved, the change.

For example, responsive to an acceptance 140 of change 135 from the user of client 125, additional merit points may be added to the merit score for the user of client 120. The increased merit score for the user of client 120 may be compared with the merit threshold. Again, if the merit score for the user of client 120 complies with the merit threshold established for the SSUD, change 135 is accepted. If not, further verification may be required and/or change 135 is simply rejected.

FIG. 1 is provided for purposes of illustration only and, as such, is not intended to be limiting of the examples provided. A network computing system may include fewer or additional client systems, an SCM system implemented using two or more inter-connected data processing systems, or the like. Additional aspects of SCM system 105 are described in greater detail within this disclosure with reference to the remaining figures.

Figure 2:
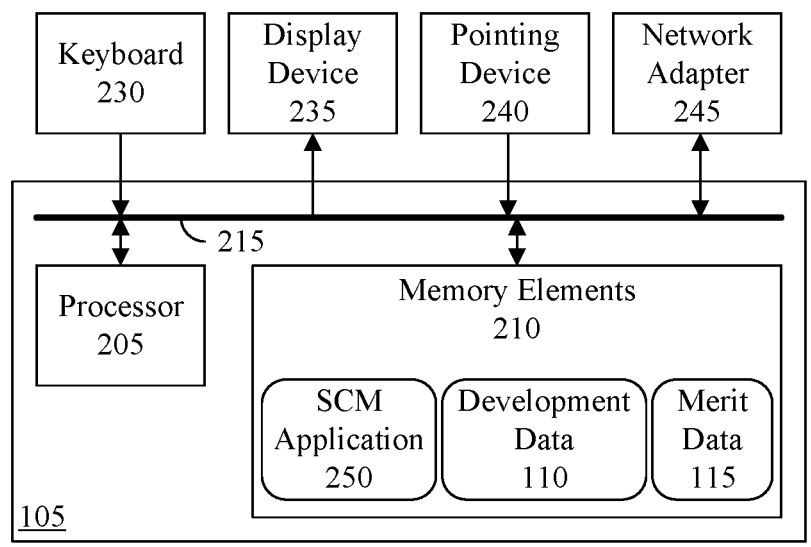
FIG. 2 is a block diagram illustrating an exemplary implementation of a software configuration management system.

FIG. 2 is a block diagram illustrating an exemplary implementation of SCM system 105 of FIG. 1. SCM system 105 can include at least one processor 205. Processor 205 may be implemented as a central processing unit (CPU) having one or more cores. Processor 205 is coupled to memory elements 210 through a system bus 215 or other suitable circuitry. As such, SCM system 105 can store program code within memory elements 210. Processor 205 executes the program code accessed from memory elements 210 via system bus 215 or the other suitable circuitry.

In one aspect, SCM system 105 is implemented as a computer or other programmable data processing apparatus that is suitable for storing and/or executing program code. It should be appreciated, however, that SCM system 105 can be implemented in the form of any system including a processor and memory that is capable of performing and/or initiating the functions and/or operations described within this specification.

Memory elements 210 include one or more physical memory devices such as, for example, local memory and one or more bulk storage devices. Local memory refers to RAM or other non-persistent memory device(s) generally used during actual execution of the program code. Bulk storage device(s) can be implemented as a hard disk drive (HDD), solid state drive (SSD), or other persistent data storage device. SCM system 105 also may include one or more cache memories that provide temporary storage of at least some program code in order to reduce the number of times program code must be retrieved from a bulk storage device during execution.

Input/output (I/O) devices such as a keyboard 230, a display device 235, and a pointing device 240 optionally can be coupled to SCM system 105. The I/O devices can be coupled to SCM system 105 either directly or through intervening I/O controllers. One or more network adapters 245 also can be coupled to SCM system 105 to enable SCM system 105 to become coupled to other systems, computer systems, remote printers, and/or remote storage devices through intervening private or public networks. Modems, cable modems, wireless transceivers, and Ethernet cards are examples of different types of network adapters 245 that can be used with SCM system 105.

As pictured in FIG. 1, memory elements 210 can store SCM application 250. SCM application 250, being implemented in the form of executable program code, is executed by SCM system 105 and, as such, is considered an integrated part of SCM system 105. As discussed with reference to FIG. 1, SCM system 105 further may include or store development data 110 and merit data 115. Development data 110 and merit data 115 are utilized by SCM system 105 in performing merit based determinations and, as such, may also be considered an integrated part of SCM system 105.

Processor 205 executes SCM application 250 thereby configuring and/or programming SCM system 105 to perform and/or initiate the various executable operations described herein relating to determining whether to accept a change based upon merit. In this regard, SCM application 250, development data 110, merit data 115, and any other data and/or parameters utilized by SCM system 105 are functional data structures that impart functionality when employed as part of SCM system 105.

Figure 3:
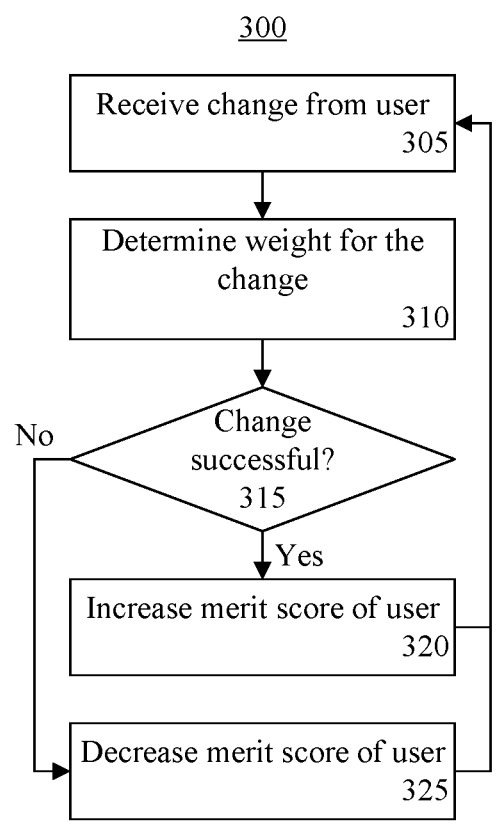
FIG. 3 is a flow chart illustrating an exemplary method of calculating a merit score for a user.

FIG. 3 is a flow chart illustrating an exemplary method 300 of calculating a merit score for a user. In general, the merit score for a user is determined according to prior changes delivered by the user to the SCM system referred to as a change history. Each change delivered to the SCM system is evaluated to determine whether the change resulted in a positive or a negative outcome. A positive outcome is considered a success and generally increases one's merit score. A negative outcome is considered unsuccessful and generally decreases one's merit score. It should be appreciated that a positive outcome may include the lack of a negative outcome. For example, a change that is delivered that does not break a build or cause a failure of some sort may be viewed as a positive outcome or a success.

In one aspect, the change history for a user, i.e., the record of changes delivered by a user and the outcome of such changes, may be stored within the SCM system. For example, one or more change histories for one or more users may be stored as part of the development data. In another aspect, however, a change history or change histories may be stored within another system external to the SCM system that may be accessed by the SCM system to determine or obtain a change history as may be required.

Method 300 is performed by the SCM system of FIGS. 1 and 2 and may be repeated over time as users continue to contribute changes. FIG. 3 is presented only to illustrate an exemplary technique for determining merit scores for a user. In describing FIG. 3, for example, the change delivered to the SMC system is presumed to have been accepted by the SCM system for one reason or another. The actual comparison of a merit score for the user with a merit threshold for the purpose of determining whether to accept the change is not described in FIG. 3.

Accordingly, in block 305, the SCM system receives a change from a user. The user, for example, checks in a change for a particular SSUD into the SCM system. In block 310, the SCM system determines a weight for the change. The weight for a change determines the amount by which the merit score for the user will be increased responsive to a positive outcome for the change or decreased for a negative outcome for the change.

In one example, the weight of the change is determined according to a delivery purpose of the change. The delivery purpose of a change is the reason the change is needed as defined within the SCM system. In checking the change into the SCM system, for example, the change is correlated with a particular delivery purpose that may be a task, a defect, or the like for the SSUD. In another example, the user may specify the delivery purpose of the change during the check-in process. Different delivery purposes may be associated with different levels of importance.

In illustration, a change that is delivered in fulfillment of a low level software maintenance task may be considered low priority or of relatively little importance. In that case, the weight of the change may be low, e.g., set to a value of one. In another example, the change may be intended to fix a critical defect in the SSUD and, as such, be considered of great importance. In that case, the weight of the change may be higher such as a value of five or more for example. The weights assigned to changes may be as varied as the delivery purposes specified within the SCM system.

In another example, the weight of a change may be determined according to a measure of complexity of the change. For example, a change considered complex will be associated with a weight that is larger than a weight for a change of lesser complexity. One measure of complexity may be the amount of program code, e.g., the number of lines of code, that is included in the change delivered or received by the SCM system. Another measure of complexity may be the cyclomatic or conditional complexity of the program code of the change. Any of a variety of known measures of complexity may be used to determine the weight for a change.

In still another example, the weight of a change can be determined using both the delivery purpose of the change and the complexity of the change. In that case, the delivery purpose may be multiplied by a first multiplier or factor. The complexity may be multiplied by a second multiplier or factor. The first and second multipliers may be different. The results maybe added, for example, to determine the weight for the change.

In yet another example, a supervisor or one responsible for creating the task, change request, or reason for the change in the SCM system may manually specify a weight for the change within the SCM system.

In block 315, the SCM system determines whether the change is successful. The determination of whether a change is successful may be performed at a time other than that when the change is checked into the SCM system. For example, the determination of whether a change is successful may not be performed until a build of the SSUD including the change is created. In another example, the determination of whether the change is successful may not be performed until the build including the change is subjected to testing, or the like.

A positive outcome and, as such, a success, is when the change either addresses or fixes the particular delivery purpose associated with the change or, in other cases, does not result in a failure of some sort. For example, if the reason for the change is a failed test and inclusion of the change causes the build within which the change is included to pass the test, the SCM system considers the change a success. If the build fails a test that was previously passed and the failure is attributable to the portion of the SSUD to which the change was applied, the SCM system considers the change unsuccessful. Examples of failures include, but are not limited to, a failure in compilation, a failure of a test such as a regression test, a JUnit test in reference to the testing framework for the Java™ programming language, or the like that is attributable to, or caused by, the change or a portion of the SSUD or build to which the change was applied.

Responsive to a determination that the change was successful, method 300 proceeds to block 320. In block 320, the SCM system increases the merit score for the user that delivered the change. The amount by which the merit score for the user is increased is the weight, or is determined according to the weight, associated with the change. After block 320, method 300 can loop back to block 305 to process further changes from the user or other users to maintain merit scores based upon the change history of each respective user.

Responsive to a determination that the change was unsuccessful, method 300 proceeds to block 325. In block 325, the SCM system decreases the merit score for the user that delivered the change. The amount by which the merit score for the user is decreased is the weight, or is determined according to the weight, associated with the change. After block 325, method 300 can loop back to block 305 to continue processing as described.

In one aspect, as part of the scoring process, the change history for a user may be updated. For example, a record of the change may be stored in association with the outcome of that change. Accordingly, while determining and/or updating a merit score for a user, the change history for that user also may be updated and/or maintained.

As noted, method 300 provides an exemplary technique for determining a merit score for a user. The inventive arrangements disclosed herein, however, are not intended to be limited by method 300. For example, while method 300 describes a process for maintaining a merit score for a user, in another example, the user may be associated with more than one merit score. Each merit score may be associated with a particular part of the SSUD or a particular software technology classification of software artifacts used to build or create the SSUD.

In illustration, consider an example in which the SSUD includes software artifacts classified into one of plurality of different technology classifications such as user interface, database, and services. In that case, the user may have a merit score for one or more or all of the various software technology classifications. The merit score for the user for the database software technology classification may be very high, thereby exhibiting a high level of skill or proficiency with database technology. The merit score associated with the services software technology classification services for the user, however, may be much lower. Thus, the user may be associated with more than one merit score where each merit score for the user is maintained independently of each other merit score and, as such, may differ. The particular merit score utilized for the user would vary according to the software technology classification of the change that is being delivered. In this regard, the SSUD may utilize different merit thresholds for different software technology classifications as described in greater detail with reference to FIG. 4.

Figure 4:
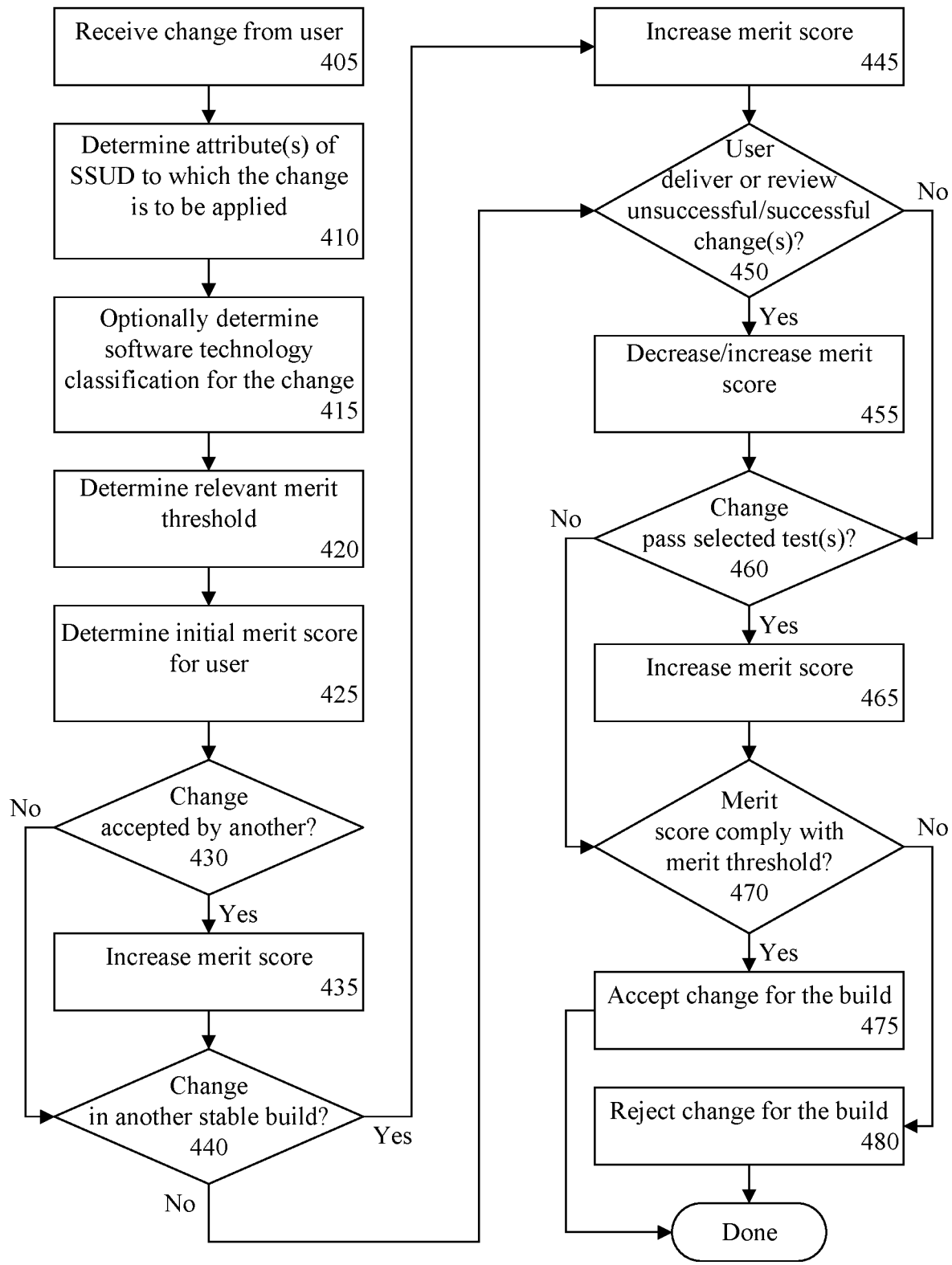
FIG. 4 is a flow chart illustrating an exemplary method of determining whether to include a change in a build of a software system under development.

FIG. 4 is a flow chart illustrating an exemplary method 400 of determining inclusion of changes in a build of an SSUD. Method 400 can be implemented by the SCM system as described within this specification.

In block 405, the SCM system receives a change from a user. In a conventional SCM system, the change delivered from a user is accepted into the system and used for a subsequent build of the SSUD. In accordance with the arrangements described herein, the SCM system labels the change, upon receipt, as "seeking approval." As such, the change delivered by the user and received by the SCM system is first evaluated as described herein prior to being accepted for inclusion in a build of the SSUD.

In block 410, the SCM system determines one or more attributes of the SSUD to which the change is to be applied. In one example, the SCM system determines the particular build of the SSUD to which the change is to be applied. In another example, the SCM system determines a particular stream or a particular branch within the SCM system to which the change is to be applied.

In general, the terms "branch," "stream" or other like terms may be used within an SCM system to identify and/or distinguish between particular versions of an SSUD. Each version, whether an older, stable version in the field or a newer less stable version still under development, may be subjected to a build process that creates a build. The particular artifacts used and/or versions of artifacts used in creating the build may vary from one branch, stream, or the like, to another. Accordingly, the particular artifacts used in a build process are specific to a particular branch, stream, etc., as the case may be, as well as the resulting build.

As an example, one version of an SSUD that includes new features may be considered a less stable build that is created nightly. The build that is created nightly may utilize a specific set of artifacts that implement new features into a version already released in the field, e.g., a version 1.2.0 as upgraded from version 1.1. Another version of the SSUD may be considered a more stable build that is generated less frequently than nightly. That build may be for version 1.1.0 of the SSUD, for example, which includes a specific set of artifacts that provide compatibility fixes. Still another entirely new version of the SSUD, e.g., version 2.0, may exist with a corresponding build. Typically, a one-to-one correspondence exists between these different versions maintained in the SCM system and builds.

In block 415, the SCM system optionally determines a software technology classification for the change. The software technology classification for a change is the particular technology classification for the particular software artifacts delivered by the user as part of the change. As discussed, examples of software technology classifications may include, but are not limited to, user interface, database, services, or the like. Further examples may be delineated according to the specific programming language used, e.g., C, C++, Java™, or the like.

In block 420, the SCM system determines a relevant merit threshold. The merit threshold is the value to which the merit score for the user is compared to determine whether to accept or reject the change. The particular merit threshold that is selected can be specific to the particular build, e.g., a particular stream, or branch of the SSUD to which the change is to be applied. In another example, the merit threshold further may be specific to the particular software technology classification of the change as determined in block 415. Thus, the merit threshold that is selected may differ in accordance with any of the aforementioned attributes discussed.

In illustration, the merit threshold for a build that is considered highly stable can be set higher than the merit threshold for a different build of the same SSUD that is less stable or experimental. Similarly, the merit threshold for a particular build for software artifacts classified as services may be set higher than the merit threshold for the same build for software artifacts classified as user interface. As demonstrated, the merit threshold can be varied in accordance with the aforementioned attributes thereby allowing more stringent controls to be exerted over whether a given change is accepted by virtue of the particular merit threshold that is applicable and/or how high such merit threshold is set.

In block 425, the SCM system determines an initial merit score for the user. In one example, the initial merit score for the user may be determined as described with reference to FIG. 3. The initial merit score is determined according to the success of prior changes delivered by the user to the SCM system. In the case where the user is associated with more than one merit score, the relevant merit score for the user is selected. For instance, if the user delivered a change that included software assets having a software technology classification of user interface, the merit score for the user for the user interface software technology classification is used as opposed, for example, to a merit score specific to a services software technology classification.

In block 430, the SCM system determines whether the change delivered by the user has been accepted by another user. As noted, acceptance of a change by another user means that such other user has reviewed and, responsive to the review, approved, i.e., accepted, the change. For example, the change delivered by the user may be reviewed by one or more other users having at least a minimum merit score. The minimum merit score may be required for authority to review. Further, the minimum merit score would be the particular merit score for the user that is applicable to the classification of the change being reviewed. If the change has been accepted by another user with at least a minimum merit score, method 400 continues to block 435. In block 435, the SCM system increases the merit score for the user responsive to the other user reviewing the change. If the change has not been accepted by another user, method 400 proceeds to block 440.

It should be appreciated that a reviewing user may access and review the change through the SCM system. For example, the reviewing user may access the change submitted in block 405 through the SCM system, perform a review of the change, and indicate acceptance, or not, through the SCM system.

In block 440, the SCM system determines whether the change exists within another stable build of the SSUD. The SCM system can determine whether the same change to the SSUD has been submitted and utilized in another build of the SSUD that is considered more stable than the build to which the current change is to be applied. If the change has been included in another build of at least a minimum level of stability, e.g., a level of stability greater than or equal to the stability level of the build for which the change is being submitted, method 400 continues to block 445. If not, method 400 continues to block 450. In block 445, the SCM system increases the merit score for the user.

Continuing with block 450, the SCM system determines whether the user has delivered or reviewed prior unsuccessful or successful changes. If so, method 400 proceeds to block 455. If not, method 400 continues to block 460.

In block 455, the SCM system decreases the merit score for the user for prior changes delivered that were unsuccessful. The SCM system increases the merit score for the user for prior changes that were successful. As discussed with reference to FIG. 3, the amount of adjustment, whether up or down, may be determined according to a weight of each respective change.

It should be appreciated that not only may the SCM system adjust the merit score for a user according to the success of prior delivered changes, the SCM system also may adjust the merit score for a user according to the success of prior changes that were approved by the user. Changes approved by the user are delivered by another user. Thus, the merit score for a user may be increased or decreased based upon the success of a change reviewed by that user. The SCM system may increase the merit score for a user responsive to approval by the user for a successful change. The SCM system may decrease the merit score for the user responsive to approval by the user for an unsuccessful change. The amount of adjustment may be determined according to the weight of the change, may be greater than the weight of the change, or may be less than the weight of the change.

In block 460, the SCM system determines whether the change has passed one or more selected tests. If so, method 400 proceeds to block 465, where the merit score for the user is increased. If not, method 400 continues to block 470.

In block 470, the SCM system determines whether the merit score for the user complies with the merit threshold. The merit score for the user is said to comply with the merit threshold when a comparison of the merit score for the user with the merit threshold results in the change received in block 405 being accepted by the SCM system for inclusion in a build. For example, in the case where higher merit scores are considered more meritorious than lower merit scores, an example of the merit score for the user complying with the merit threshold is the merit score for the user exceeding the merit threshold. In another example, the merit score may be greater than or equal the merit threshold.

In an example where lower merit scores are considered more meritorious than higher merit scores, an example of the merit score for the user complying with the merit threshold is where the merit score for the user is less than the merit threshold. In another example, the merit score may be less than or equal to the merit threshold.

In any case, the SCM system compares the merit score for the user, as adjusted in performing method 400, with the merit threshold. When the merit score for the user complies with the merit threshold, method 400 proceeds to block 475. In block 475, the SCM system accepts the change delivered from the user for the build. The SCM system uses the change received in block 405 within the build to which the change applies.

When the merit score for the user does not comply with the merit threshold, method 400 continues to block 480. In block 480, the SCM system rejects the change delivered from the user for the build. In that case, the change received in block 405 is not used in the build to which the change applies.

FIG. 4 is provides for purposes of illustration only and, as such, is not intended to limit the inventive arrangements described herein. For example, one or more blocks may be arranged differently than previously described. In one aspect, a comparison of the merit score for the user with the merit threshold can be performed responsive to receipt of the change from the user. In that case, further evaluations that may result in an increase of the merit score for the user would only be performed responsive to determining that the merit score for the user does not comply with the merit threshold.

This disclosure provides method(s), system(s), and computer program product(s) directed to SCM and, more particularly, to determining which changes are to be accepted in a build of an SSUD based upon merit. When a user provides a change for an SSUD to an SCM system, the merit score for the user is compared with an applicable merit threshold. Whether the change delivered by the user is accepted or rejected by the SCM system depends upon whether the merit score for the user complies with the merit threshold.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method, comprising:
receiving, from a first user, a change to a software system under development from a first user;
calculating, based upon success of prior changes received from the first user, a merit score for the first user;
comparing the merit score for the first user with a merit threshold for the software system under development;
determining that the merit score for the first user complies with the merit threshold; and
accepting, responsive to the determining, the change from the first user for inclusion in a build of the software system under development.

2. The method of claim 1, wherein:
the software system under development includes software artifacts from a plurality of different software technology classifications;
the change is for a software artifact of a selected one of the plurality of different software technology classifications; and
the merit score for the first user compared with the merit threshold is specific to the selected software technology classification.

3. The method of claim 1, wherein
the merit score for the first user is adjusted according to whether a test applied to the build including the change is successful.

4. The method of claim 1, wherein
the change is approved by a second user having at least a minimum merit score, and
the merit score for the second user is adjusted according to the change in the build of the software system under development being successful.

5. The method of claim 1, wherein
the merit score for the first user is increased responsive to determining that the change is included in a different and more stable build of the software system under development.

6. A computer-implemented system, comprising:
a hardware processor programmed to initiate the following executable operations:
receiving, from a first user, a change to a software system under development from a first user;
calculating, based upon success of prior changes received from the first user, a merit score for the first user;
comparing the merit score for the first user with a merit threshold for the software system under development;
determining that the merit score for the first user complies with the merit threshold; and
accepting, responsive to the determining, the change from the first user for inclusion in a build of the software system under development.

7. The system of claim 6, wherein:
the software system under development includes software artifacts from a plurality of different software technology classifications;
the change is for a software artifact of a selected one of the plurality of different software technology classifications; and
the merit score for the first user compared with the merit threshold is specific to the selected software technology classification.

8. The system of claim 6, wherein
the merit score for the first user is adjusted according to whether a test applied to the build including the change is successful.

9. The system of claim 6, wherein
the change is approved by a second user having at least a minimum merit score, and
the merit score for the second user is adjusted according to the change in the build of the software system under development being successful.

10. The system of claim 6, wherein
the merit score for the first user is increased responsive to determining that the change is included in a different and more stable build of the software system under development.

11. A computer program product, comprising:
a hardware storage device having program code stored thereon,
the program code, which when executed by a computer hardware system, causes the computer hardware system to perform:
receiving, from a first user, a change to a software system under development from a first user;

calculating, based upon success of prior changes received from the first user, a merit score for the first user;

comparing the merit score for the first user with a merit threshold for the software system under development;

determining that the merit score for the first user complies with the merit threshold; and accepting, responsive to the determining, the change for inclusion in a build of the software system under development.

12. The computer program product of claim 11, wherein:

the software system under development includes software artifacts from a plurality of different software technology classifications;

the change is for a software artifact of a selected one of the plurality of different software technology classifications; and the merit score for the first user compared with the merit threshold is specific to the selected software technology classification.

13. The computer program product of claim 11, wherein the merit score for the first user is adjusted according to whether a test applied to the build including the change is successful.

14. The computer program product of claim 11, wherein the change is approved by a second user having at least a minimum merit score, and the merit score for the second user is adjusted according to the change in the build of the software system under development being successful.

15. The computer program product of claim 11, wherein the merit score for the first user is increased responsive to determining that the change is included in a different and more stable build of the software system under development.

* * * * *